(No Model.)
J. & P. JUST.
HEATING APPARATUS.
No. 395,980. Patented Jan. 8, 1889.
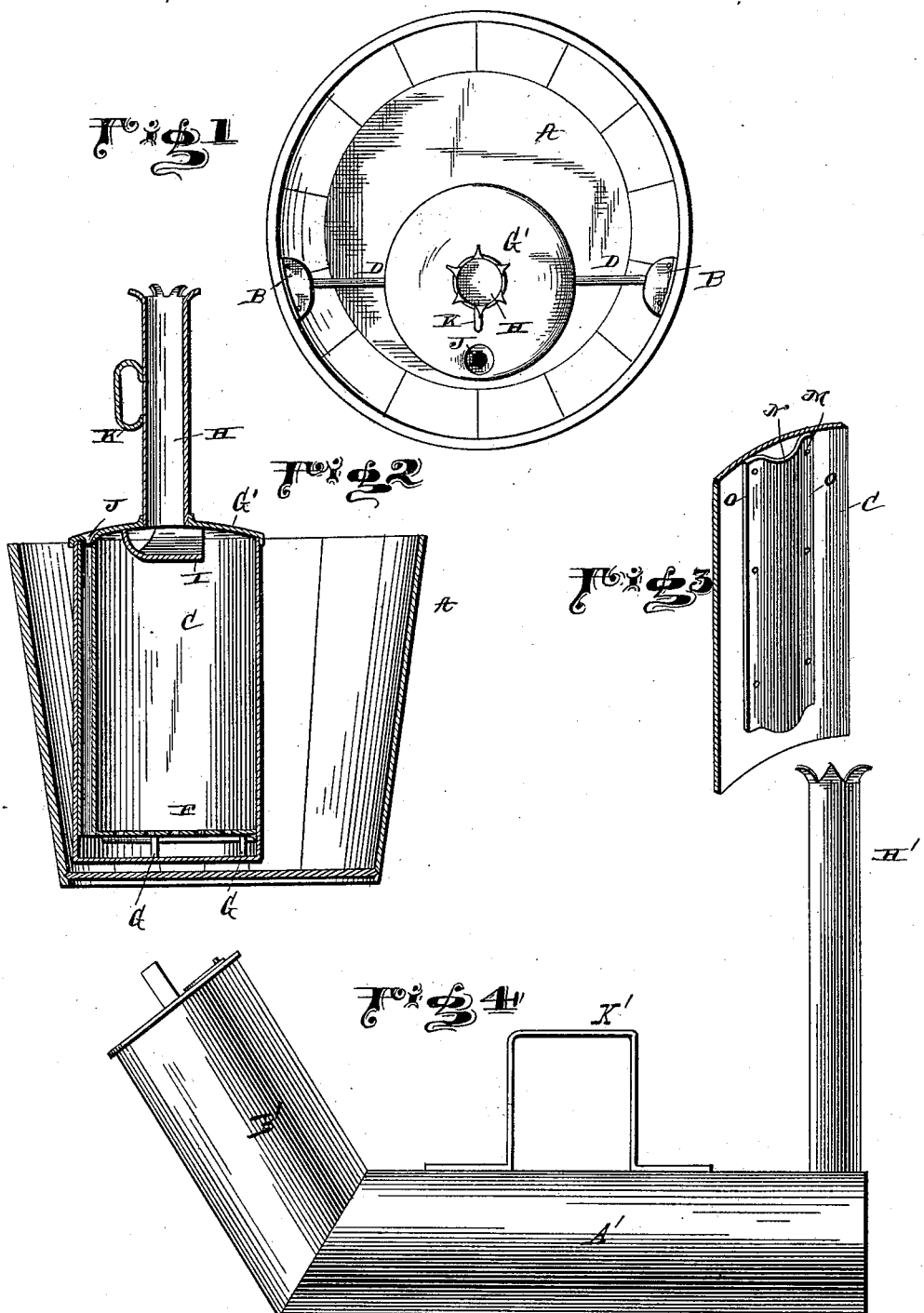

UNITED STATES PATENT OFFICE.

JOHN JUST AND PETER JUST, OF SAUK CITY, WISCONSIN.

HEATING APPARATUS.

SPECIFICATION forming part of Letters Patent No. 395,980, dated January 8, 1889.

Application filed July 17, 1888. Serial No. 280,219. (No model.)

*To all whom it may concern:*

Be it known that we, JOHN JUST and PETER JUST, citizens of the United States, and residents of Sauk City, in the county of Sauk and State of Wisconsin, have invented certain new and useful Improvements in Heating Apparatus; and we do hereby declare that the following is a full, clear, and exact description of the invention, which will enable others skilled in the art to which it appertains to make and use the same, reference being had to the accompanying drawings, which form a part of this specification, and in which—

Figure 1 is a top plan view of our improved heating device. Fig. 2 is a vertical sectional view of the same. Fig. 3 is a perspective view of a portion of the magazine, showing a slightly-different form of draft-flue secured thereto; and Fig. 4 is a side elevation of a modification of our heating device.

Similar letters of reference denote corresponding parts in the several figures.

Our invention has relation to heating apparatus for heating water for agricultural purposes; and it consists in the improved construction and combination of parts, as will be hereinafter more fully set forth.

In the accompanying drawings, the letter A denotes the receptacle adapted to contain the water to be heated. This receptacle is provided on its inner side, near its upper edge, with two ears, B, opposite each other, the object of which will be presently set forth.

A cylindrical fire-pot or heater, C, is removably secured in the water-receptacle by means of laterally-projecting pins D, secured in its outer side, engaging with the ears B of the said receptacle. Extending from the top of this magazine nearly to the bottom thereof is a draft-flue of tubular form, and within this fire-pot or heater is a removable grate, F, which is supported upon suitable legs, G, above the lower end of the draft-flue.

Placed upon the top of the fire-pot or heater is a removable cover, G', which is provided with an ordinary smoke-pipe, H, the lower end of which is guarded by a spark and heat arrester, I, of the usual construction. An opening, J, is formed in the cover, and is adapted to register with the upper end of the draft-flue to regulate the draft in the fire-pot or heater. The smoke-pipe is provided with a handle, K, by means of which it may be lifted from the top of the fire-pot or heater when filling the same with fuel.

If desired, the tubular draft-flue may be removed and the one shown in Fig. 3 employed. This flue consists of a piece or strip of metal, M, curved as shown at N, and formed with the longitudinal sides O at nearly right angles to the curved portion. By means of these longitudinal edges or sides it will be seen that it may be easily and conveniently riveted or otherwise secured to the interior of the fire-pot or heater.

The operation of our invention is as follows: The magazine is secured with its laterally-projecting pins in the water-receptacle, the said arms bearing against the under sides of the ears of the said receptacle, and fuel placed therein upon the grate. The fuel is now lighted and the cover of the fire-pot or heater is secured in place and turned, so as to allow the opening in its top to register with the draft-flue, so as to produce the desired draft. In this manner the water in the receptacle will become thoroughly heated, and after having become so the heating apparatus may be disengaged from the ears of the receptacle and lifted out of the same, and the heated water may be carried to the places on the farm where needed.

It will be seen that by constructing the top in the manner set forth—that is, with the draft-opening—the draft may be regulated at will by simply turning the said top or covering so as to cause the draft-flue to register with the entire opening or with a portion thereof. The turning of the top or cover may be accomplished by the handle upon the smoke-pipe.

When it is desired to heat water in shallow troughs, we prefer to construct the apparatus as shown in Fig. 4 of the drawings, wherein is represented a horizontal cylindrical body portion, A', from one end of which projects an upwardly and outwardly inclined similarly-made feeding end portion, B'. To the upper side of the body portion A', at the opposite end thereof, is applied the smoke-stack H'; also, to the upper side of the part A', about at the middle, is secured a handle, K'.

From the foregoing description, taken in connection with the accompanying drawings, the operation and advantages of our invention will readily suggest themselves without requiring an extended explanation.

It will be seen that it is easily attached to the water-receptacle and as easily detached, and that by the arrester at the lower end of the smoke-pipe heat and the products of combustion are prevented from too rapidly escaping from the smoke-pipe, while it is simple in construction, and consequently can be placed upon the market at such a small figure as to bring it within the reach of all classes.

Having thus described our invention, we claim and desire to secure by Letters Patent of the United States—

The combination, with the fire-pot or heater having an interior draft-flue, of the removable cover having an opening registering with said draft-flue and rotatable upon said fire-pot or heater to permit of the closing of the latter flue, substantially as set forth.

In testimony that we claim the foregoing as our own we have hereunto affixed our signatures in presence of two witnesses.

JOHN JUST.
PETER JUST.

Witnesses:
W. TRIPP,
CHAS. SCHLUNGBAUM.